Figure 1:
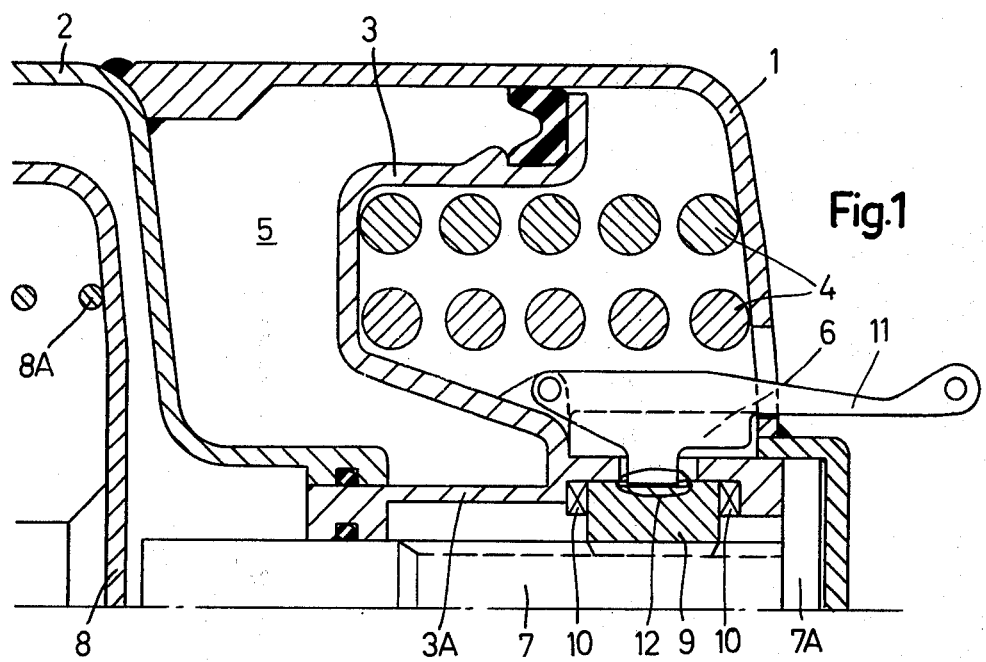

United States Patent [19]
Dahlkvist et al.

[11] 3,994,206
[45] Nov. 30, 1976

[54] DEVICE FOR DISCONTINUING AND AUTOMATICALLY RESTORING THE OPERATIONAL FUNCTION OF A SPRING BRAKE ACTUATOR

[75] Inventors: Nils Goran Dahlkvist; Lars Bengt Axelsson, both of Durham, England; Nils Borje Lennart Sander, Malmo, Sweden

[73] Assignee: Svenska Aktiebolaget Bromsregulator, Malmo, Sweden

[22] Filed: Dec. 10, 1975

[21] Appl. No.: 639,407

Related U.S. Application Data

[63] Continuation of Ser. No. 514,929, Oct. 15, 1974, abandoned.

[30] Foreign Application Priority Data

Oct. 25, 1973  Sweden .............................. 7314472

[52] U.S. Cl. ....................................... 92/29; 92/63; 92/130 A; 188/170; 192/91 R
[51] Int. Cl.² ............................................. F01B 9/00
[58] Field of Search ................. 188/170; 92/61, 63, 92/64, 130 A, 29; 192/91 R; 303/6 M

[56] References Cited

UNITED STATES PATENTS

| | | | |
|---|---|---|---|
| 3,107,583 | 10/1963 | Woodward | 92/63 |
| 3,704,653 | 12/1972 | Higgins | 92/29 |
| 3,782,251 | 1/1974 | Marchand | 92/63 |
| 3,895,695 | 7/1975 | Hunter | 188/170 |

*Primary Examiner*—George E. A. Halvosa
*Attorney, Agent, or Firm*—Laurence R. Brown

[57] ABSTRACT

A manual disconnecting device is provided for disengaging the brake push rod in a spring brake actuator having a movable piston holding the spring compressed by fluid pressure during normal operation. The device once manually disconnected is automatically reconnected upon a normal spring compression stroke of the piston. The disconnecting device provides a clutching device between the piston and the push rod engaging a nut threaded on the push rod with non-self-locking threads. In one embodiment the nut us journalled in the piston. In another embodiment there are clutch surfaces on both the piston and nut which are disengaged by a rotary motion from a special tool.

2 Claims, 4 Drawing Figures

DEVICE FOR DISCONTINUING AND AUTOMATICALLY RESTORING THE OPERATIONAL FUNCTION OF A SPRING BRAKE ACTUATOR

This is a continuation of application Ser. No. 514,929, filed Oct. 15, 1974, now abandoned.

A conventional spring brake actuator comprises a cylinder, a piston, and a spring actuating the piston. The spring is normally held compressed by fluid pressure acting on the piston, and at a pressure fall the spring will force the piston, which is connected to further parts of a vehicle brake rigging, in a brake applying direction. Such an actuator is normally used as a parking and emergency brake actuation for a vehicle and is in such a case attached to a service brake actuator, whose piston will be actuated by a push rod of the spring brake actuator.

If the vehicle has to be moved in the absence of fluid pressure for the spring brake actuator it is necessary to relieve the force from the spring on the brake rigging. One way to accomplish this is to compress the spring manually by means of an external tool engaging the piston or the push rod. This work is however both tiresome and time-consuming. Another and in most cases preferred way is to disengage the push rod from the piston, so that the push rod can be retracted. A requirement is that the normal function of the actuator shall be restored automatically after the return of fluid pressure for the spring compression.

This invention thus relates to a device for discontinuing and automatically restoring the operational function of a spring brake actuator, preferably arranged in series with a service brake actuator and comprising a cylinder, a piston, a push rod, a spring actuating the piston in an operation direction forward for brake application at the fall of a fluid pressure acting on the other side of the piston, and a conveying mechanism between the piston and the push rod, which mechanism at the piston movement forward is arranged to convey the push rod but is disconnectable for making possible a return of the push rod alone at a carried forward piston and is arranged to return automatically to a position for again conveying the push rod after the piston return.

Such devices are known but are marred by certain disadvantages, such as being complex, expensive or, last but not least, less reliable.

The object of the present invention is to accomplish a device of the kind referred to which is extremely simple and cheap but still very reliable and easy to control manually.

This is according to the invention attained in that the conveying mechanism consists of a nut in non-self-locking engagement with screw-threads on the push rod and an externally disengagable, spring-actuated clutch between the nut and the piston, the clutch being arranged automatically to be re-engaged under the influence of the forces appearing at the piston return.

This means that the clutch will be held in continuous engagement during all normal operation of the spring brake actuator and thus that no parts of the conveying mechanism move relative to each other under normal conditions, making the device very reliable. The clutch is only mechanically disengaged at the disconnection of the piston and the push rod, so that the latter may be returned to its initial position under the influence of the return spring in the brake rigging, especially the return spring in the service brake actuator.

It is to be noted that the spring brake actuator need not be connected to a service brake actuator. In many cases it is preferred to disperse with the service brake actuator and to use the spring brake actuator also for service braking. In such cases there may be springs in the brake rigging for the return of the piston rod, or else the push rod may be retracted manually after the disconnection of the piston and the push rod.

In a first embodiment of the invention the nut is rotatably journalled in the piston and a manually actuatable control arm is attached to the piston in resilient engagement with ratchet teeth on the nut. The piston rod is in this case provided with a flange for cooperation with the piston during the piston return.

In a second embodiment there are cooperating clutch surfaces, preferably provided with teeth, on the nut and the piston. These surfaces are held in engagement with each other by means of a clutch spring between a flange on the piston and an anti-friction bearing on the nut, and there is an externally actuatable sleeve for disengagement of the clutch surfaces against the action of the clutch spring. This sleeve is in non-self-locking thread engagement with the piston, and an anti-friction bearing is arranged on the sleeve for engagement with the nut. By this arrangement it is possible to disengage the clutch by turning the sleeve with an appropriate tool, and the sleeve will return to its initial position due to its non-self-locking engagement with the piston.

Figure 2:
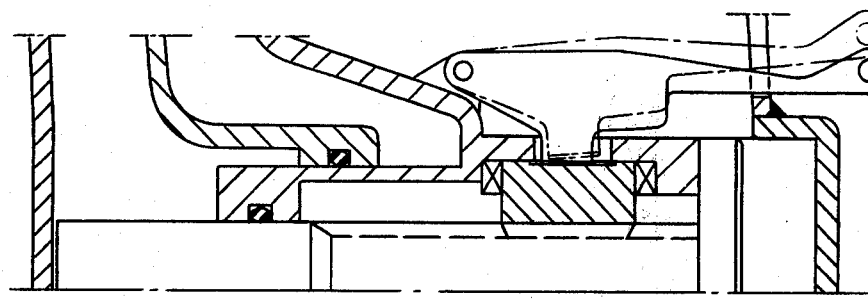
Figure 3:
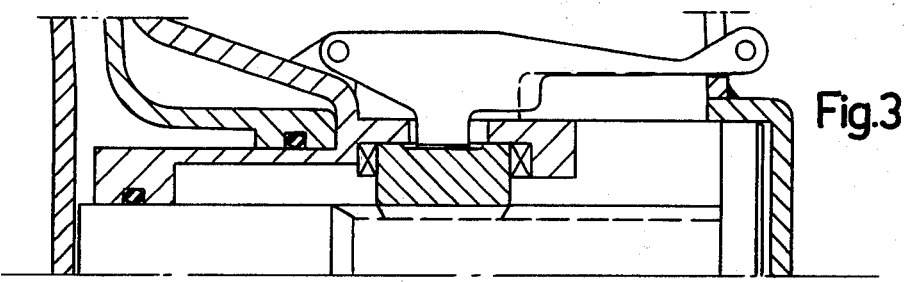
Figure 4:
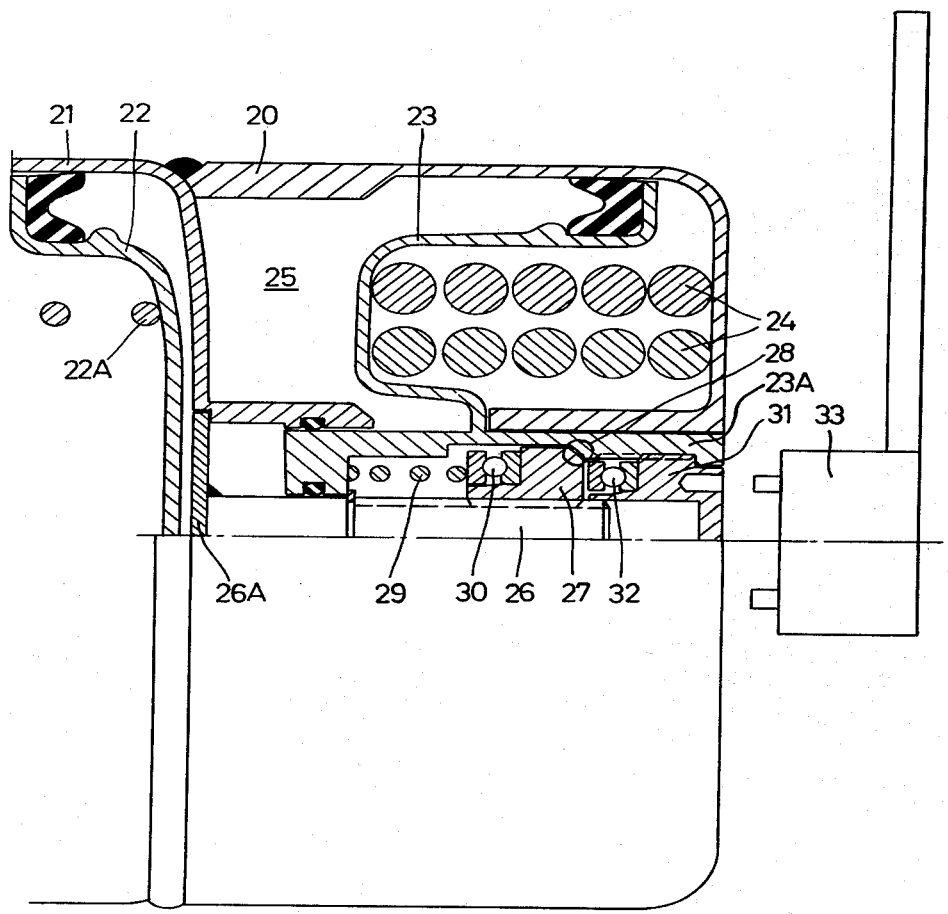

The invention shall be described in further detail below, reference being made to the accompanying drawings, in which:

FIGS. 1–3 are sectional views of a first embodiment of the invention in three different working positions, and FIG. 4 is a sectional view of a second embodiment of the invention.

As appears from FIG. 1 a spring brake cylinder 1 is attached to a service brake cylinder 2. A spring brake piston 3 is acted upon by on one side a spring 4 and on the other side fluid pressure in a fluid chamber 5. The central part of this piston can be called a piston rod 3A and is guided for axial movements by an opening in the service brake cylinder end wall and a guiding tube 6 attached to the spring brake cylinder 1 and having a closed end constituting a stop for the return movement (to the right) of a push rod 7. This push rod is provided with a flange 7A as shown and is arranged to act on a service brake piston 8, which as usual is connected to suitable parts of the brake rigging and is acted upon by a return spring 8A.

A nut 9 is rotatably journalled in the piston 3 by means of anti-friction bearings 10 and has a non-self-locking engagement with threads on the push rod 7. The nut is provided with ratchet teeth on its outer periphery. A control lever 11 is pivotally attached to the piston 3 and extends out from the cylinder 1. The lever is urged into engagement with the ratchet teeth on the nut 9 as shown in FIG. 1 by means of a spring (not shown), thus constituting a spring-actuated clutch 12.

The thread direction on the push rod 7 and the locking direction of these ratchet teeth in cooperation with the control lever 11 are such that on normal application at falling fluid pressure and under the influence of the spring 4 the nut 9 will be locked on the push rod 7, which means that the force from the piston will be transmitted to the push rod 7 via the nut 9 (and then further to the brake rigging via the service brake piston 8). On the return stroke (under the influence of fluid pressure in the fluid chamber 5) the force from the piston will be transmitted to the push rod 7 over its flange 7A.

The conditions at the loss of fluid pressure in the fluid chamber 5 are shown in FIGS. 2 and 3, which are not provided with any reference numerals for the sake of clarity. Thus, if the brakes are applied and no fluid pressure is available for the desired return of the piston 3, the control lever 11 is to be lifted to the position shown with dash-dotted lines in FIG. 2. The different parts will then assume the positions shown in FIG. 3, i.e. the push rod 7 will move to its extreme right position under the influence of the return spring 8A for the service brake piston 8, whereas the spring brake piston 3 will move to its extreme left position under the influence of the spring 4 (and the control lever 11 will be spring-biassed to the shown position engaging the ratchet teeth on the nut 9).

It is now evident that the spring 4 has no influence on the service brake piston and thus not on the vehicle brake rigging and that it will be possible to move the vehicle in spite of the fact that no fluid pressure is availabe, i.e. that the spring brake actuator is applied.

When the fluid pressure returns to the fluid chamber 5 the piston 3 will move to the right, and during this movement the nut 9 will rotate on the push rod 7 and the control lever 11 will only slide on the ratchet teeth due to their opposite locking direction. When the position according to FIG. 1 has been reassumed the spring brake actuator is ready for normal operation.

In the second embodiment according to FIG. 4 a spring brake cylinder 20 is attached to a service brake cylinder 21 which is provided with a service brake piston 22 and a piston return spring 22A. A spring brake piston 23 is acted upon by on one side a spring 24 and on the other side fluid pressure in a fluid chamber 25. The central part of the piston is guided for axial movements by suitable tubular parts of the two cylinders and can be called a piston rod 23A. The force from the piston 23 to the service brake piston 22 and further to parts of the vehicle brake rigging is trnsmitted over a push rod 26 via a nut 27 in non-self-locking engagement with screw threads on the former. Between the piston rod 23A and the nut 27 there is a dog clutch 28 as shown, which is normally held in engagement by a clutch spring 29 acting on the nut 27 via an anti-friction bearing 30. The push rod 26 is provided with an end plate 26A acting as a stop for the return movement.

The device is further provided with a control sleeve 31 threadingly engaging the piston rod 23A as shown. This engagement is preferably non-self-locking. There is a positive stop for the return movement of the control sleeve. An anti-friction bearing 32 is mounted on the control sleeve 31 at some distance from the nut 27. The control sleeve is provided with attachments for a tool 33.

At a fluid pressure fall in the fluid chamber 25 the spring 24 will exert its force on the piston 23, the piston rod 23A, the nut 27, and the push rod 26, and further on suitable parts of the vehicle brake rigging (not shown). At the return of the fluid pressure the different parts will return to their shown positions; the dog clutch 28 will not be disengaged under this normal operation.

If the force from the spring 24 on the push rod 26 is to be discontinued at the absence of fluid pressure in the fluid chamber 25, the central sleeve 31 (or rather its anti-friction bearing 32) is brought into engagement with the nut 27 by turning the sleeve by means of the tool 33, so that the dog clutch 28 is disengaged. The nut 27 will now be free to rotate on the push rod 26, which will return to the shown position under the influence of the return spring 22A in the service brake actuator, whereas the piston 23 will move to its extreme left position under influence of the spring 24. When the fluid pressure returns the push rod 26 will be prevented from moving to the right due to the plate 26A, whereas the dog clutch 28 will be disengaged due to the force now acting to the right on the piston rod 23A and the stopping force on the push rod 26. The effect will be that at the end the different parts will have the shown positions and that the device will be ready for normal operation.

It is to be noted that the invention is not limited to spring brake actuators attached to service brake actuators and used as parking and emergency actuators. Spring brake actuators are sometimes used alone, in which case the fluid pressure will govern the force from the spring on the piston rod. The invention is equally applicable to such actuators, provided that there is any means for returning the push rods to their initial positions, for example a return spring in the brake rigging.

Modifications are possible within the scope of the appended claims.

We claim:

1. In a device for discontinuing and automatically restoring the operational function of a spring brake actuator with a spring compressed by fluid pressure in the brake system, preferably arranged in series with a service brake actuator and comprising a cylinder with a fluid pressure operated piston movable therein to operate a brake push rod and having a spring actuating the piston in an operation direction forward for brake application at the fall of fluid pressure acting on the piston, the combination comprising, a conveying mechanism carried by the push rod, which mechanism at the piston movement forward is arranged to convey the push rod but is disconnectable for making possible a return of the push rod alone when said fluid pressure falls and is arranged to return automatically to a position for again conveying the push rod after the fluid pressure returns, wherein the conveying mechanism consists of a nut in non-self-locking engagement with screw-threads on the push rod, a clutch movable with the piston for holding the nut from rotation, manually operable means extending external to said piston for disengaging the clutch until reengaged by movement of said piston when the fluid pressure returns the piston to its return position with brakes disengaged to thereby permit the nut to rotate in response to relative movement between said piston and said push rod thereby comprising means mechanically connected to said piston causing return movement by said piston automatically to rotate said nut with said clutch in disengaged position and including structure re-engaging said clutch to convey said push rod by rotating said nut under the influence of the forces transmitted by the moving piston to engage the clutch for a braking stroke when the fluid pressure moves said piston to the end of its return stroke said clutch comprising ratchet teeth on said nut and means engaging them, the nut being rotatably journalled in the piston and said means for disengaging the clutch comprises a control arm pivoted on the piston and held in engagement actuating the clutch and constituting a pawl mating with said ratchet teeth on the nut thereby registering with said control arm to engage said clutch, and having a manually accessible member for pivoting the control arm to release said clutch and permit said nut to rotate on said rod while out of engagement with said control arm in a direction otherwise held from rotation by said control arm.

2. A device according to claim 1, characterized by a flange on the push rod for engagement with the piston during the piston return to move said push rod and rotate thereon said nut into position on said push rod engaging said control arm for permitting the piston to operate said brake push rod in the forward direction.

* * * * *